United States Patent
Bai et al.

(10) Patent No.: US 11,921,418 B2
(45) Date of Patent: Mar. 5, 2024

(54) SHUTTER AND PHOTOGRAPHING APPARATUS

(71) Applicant: SZ DJI TECHNOLOGY CO., LTD., Shenzhen (CN)

(72) Inventors: Longji Bai, Shenzhen (CN); Tongyao Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/990,886

(22) Filed: Nov. 21, 2022

(65) Prior Publication Data
US 2023/0079584 A1 Mar. 16, 2023

Related U.S. Application Data

(63) Continuation of application No. PCT/CN2020/093463, filed on May 29, 2020.

(51) Int. Cl.
*G03B 9/44* (2021.01)

(52) U.S. Cl.
CPC .................. *G03B 9/44* (2013.01)

(58) Field of Classification Search
CPC ... G03B 9/10; G03B 9/18; G03B 9/22; G03B 9/44
See application file for complete search history.

(56) References Cited

U.S. PATENT DOCUMENTS

| 2011/0206362 A1* | 8/2011 | Viglione | G03B 9/10 |
| | | | 396/453 |
| 2012/0076486 A1* | 3/2012 | Bai | G03B 9/06 |
| | | | 396/463 |
| 2014/0300944 A1* | 10/2014 | Stephenson | G02B 26/00 |
| | | | 359/230 |
| 2021/0103202 A1* | 4/2021 | Zhu | G03B 17/02 |

FOREIGN PATENT DOCUMENTS

| CN | 1476148 A | 2/2004 |
| CN | 1525230 A | 9/2004 |
| CN | 101878449 A | 11/2010 |
| CN | 102822736 A | 12/2012 |
| CN | 108700793 A | 10/2018 |
| GB | 774958 A | 5/1957 |

OTHER PUBLICATIONS

International Search Report (dated Feb. 22, 2021).

* cited by examiner

*Primary Examiner* — Christopher E Mahoney
(74) *Attorney, Agent, or Firm* — FIDELI LAW PLLC

(57) ABSTRACT

A shutter and a photographing apparatus are provided. The shutter includes: a shutter base including an exposure opening; a shutter mechanism including a blade assembly and a synchronizer ring for driving the blade assembly, the synchronizer ring being movable between a first position and a second position, and the exposure opening being open when the synchronizer ring is in the first position and closed when the synchronizer ring is in the second position; and a braking member for decelerating the shutter mechanism. In the (Continued)

shutter and the photographing apparatus according to the present disclosure, the shutter mechanism may be buffered when the blade assembly closes the exposure opening of a camera, so as to prevent the shutter mechanism from being damaged.

18 Claims, 14 Drawing Sheets

SHUTTER AND PHOTOGRAPHING APPARATUS

RELATED APPLICATIONS

This application is a continuation application of PCT application No. PCT/CN2020/093463, filed on May 29, 2020, and the content of which is incorporated herein by reference in its entirety.

TECHNICAL FIELD

Embodiments of the present disclosure relate to photographing apparatus technologies, and particularly to a shutter and a photographing apparatus.

BACKGROUND

A photographing apparatus, such as a camera, is typically provided with a shutter for controlling an exposure time. The shutter includes a shutter mechanism and a blade assembly in a transmission connection with the shutter mechanism. The shutter mechanism controls a closing speed of the blade assembly, so as to control the exposure time of the camera.

However, since the blade assembly has a relatively high closing speed, when the blade assembly closes an exposure opening of the camera, some components in the shutter mechanism may be subjected to a large impact force, which may damage the shutter mechanism.

BRIEF SUMMARY

In order to overcome the above-mentioned defect in the existing technologies, an object of the embodiments of the present disclosure is to provide a shutter and a photographing apparatus, where a shutter mechanism thereof may be buffered when a blade assembly thereof closes an exposure opening of a camera, so as to prevent the shutter mechanism from being damaged.

In a first aspect, some exemplary embodiments of the present disclosure provide a shutter, including: a shutter base including an exposure opening; a shutter mechanism including a blade assembly and a synchronizer ring to drive the blade assembly, where the synchronizer ring is movable between a first position and a second position, and the exposure opening is open when the synchronizer ring is in the first position and closed when the synchronizer ring is in the second position; and a braking member to decelerate the shutter mechanism.

In a second aspect, some exemplary embodiments of the present disclosure further provides a photographing apparatus, including a shutter including: a shutter base including an exposure opening, a shutter mechanism including a blade assembly and a synchronizer ring to drive the blade assembly, where the synchronizer ring is movable between a first position and a second position, and the exposure opening is open when the synchronizer ring is in the first position and closed when the synchronizer ring is in the second position, and a braking member to decelerate the shutter mechanism.

In the shutter and the photographing apparatus according to some exemplary embodiments of the present disclosure, the shutter may include the shutter base, the shutter mechanism and the braking member; the blade assembly in the shutter mechanism may close and open the exposure opening of the shutter under a driving effect of the synchronizer ring. When the blade assembly closes the exposure opening, the braking member may decelerate the shutter mechanism, so as to reduce the impact force applied to the shutter mechanism when the exposure opening is closed, thus avoiding the damage to the shutter mechanism.

REFERENCE NUMERALS

10—shutter base;
11—exposure opening;
12—limiting block;
20—synchronizer ring;
21—limiting protrusion;
22—driving slide slot;
23—first driving shaft;
24—second driving shaft;
30—blade assembly;
31—first blade;
32—second blade;
40—driving device;
50—braking ring;
51—limiting slot;
52—first limiting portion;
53—second limiting portion;
54—limiting hole;
60—friction member;
61—friction portion;
62—hook-shaped portion;
70—biasing member;
71—mounting hole;
311—first driving hole;
312—first reinforcing sheet;
321—second driving hole;
322—second reinforcing sheet.

DETAILED DESCRIPTION

To make the objectives, technical solutions, and advantages of the embodiments of the present disclosure more clear, the following describes the technical solutions of some exemplary embodiments of the present disclosure with reference to the accompanying drawings. Apparently, the described exemplary embodiments are merely some but not all of the embodiments of the present disclosure. All other embodiments obtained by a person of ordinary skill in the art based on these exemplary embodiments of the present disclosure without creative efforts shall fall within the scope of protection of the present disclosure.

For convenience of description of some exemplary embodiments, a first side of a shutter base in some exemplary embodiments refers to a front side of the shutter base, and a second side of the shutter base refers to a back side of the shutter base.

Figure 1:
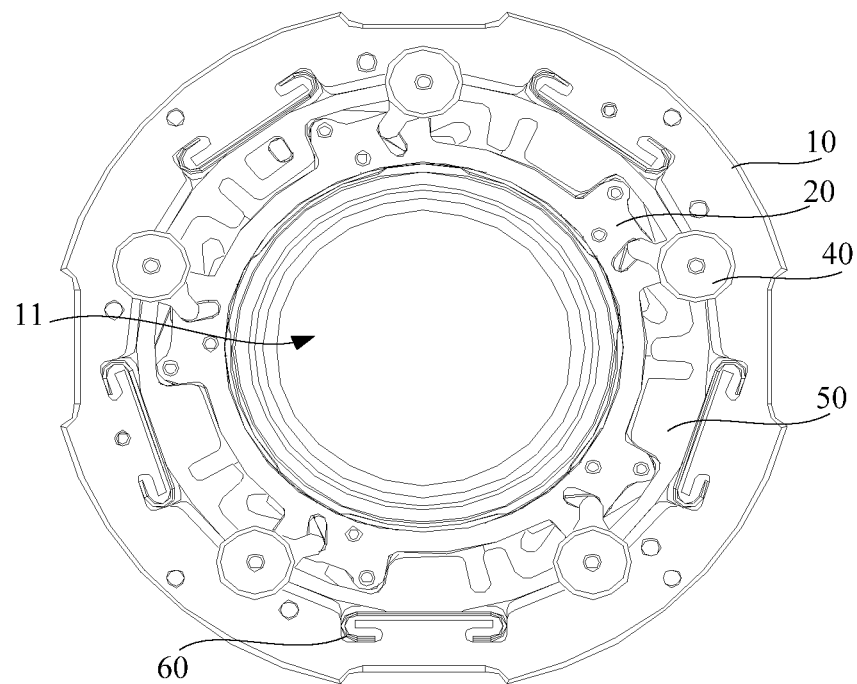
FIG. 1 is a front view of a shutter according to some exemplary embodiments of the disclosure.
Figure 2:
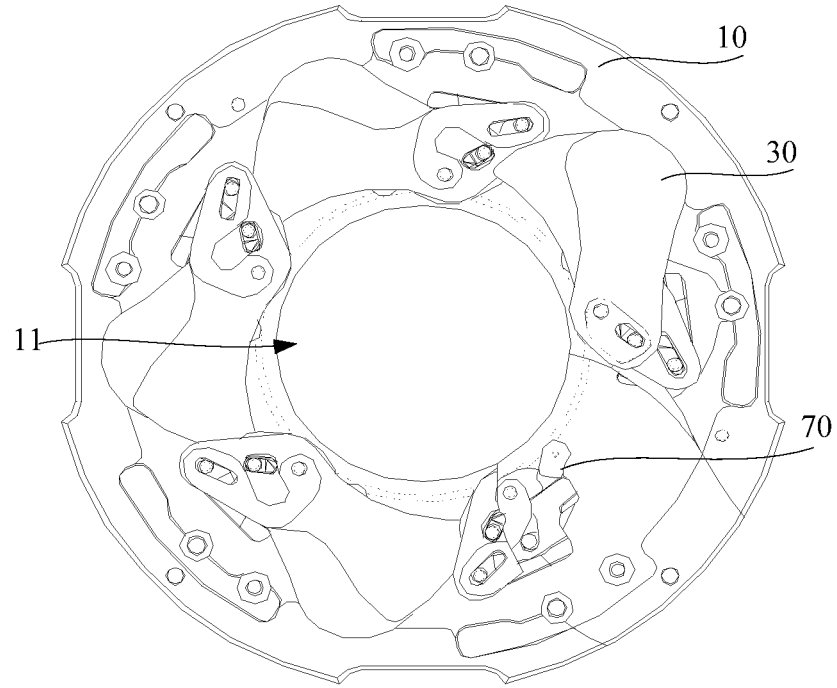
FIG. 2 is a rear view of a shutter according to an embodiment of the present disclosure.
Figure 3:
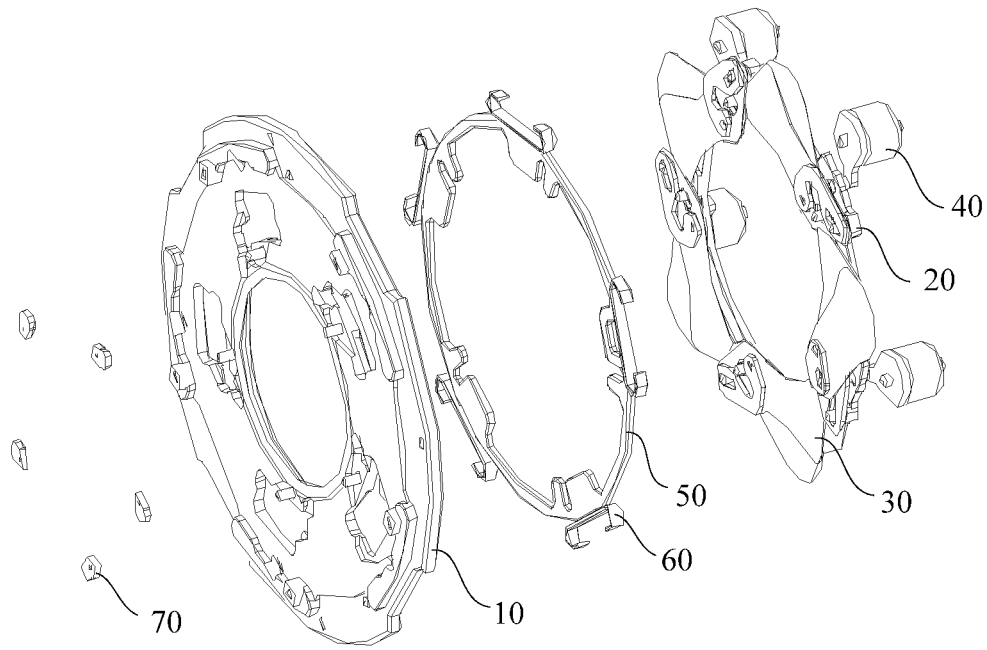
FIG. 3 is a schematic exploded diagram of a shutter according to some exemplary embodiments of the present disclosure.

As shown in FIGS. 1 to 3, a shutter according to some exemplary embodiments of the present disclosure may include a shutter base 10, a shutter mechanism, and a braking member for decelerating the shutter mechanism; the shutter base 10 is provided with an exposure opening 11; in some exemplary embodiments, the exposure opening 11 may be a part of the shutter base 10; in some exemplary embodiments, the exposure opening 11 may be formed by other components and provided in the shutter base 10. The shutter mechanism may include a blade assembly 30 and a synchronizer ring 20 for driving the blade assembly 30. The synchronizer ring 20 may be movable between a first position and a second position, and the exposure opening 11 is open when the synchronizer ring 20 is in the first position, and closed when the synchronizer ring 20 is in the second position.

In some exemplary embodiments, the shutter mechanism may be mounted on the shutter base 10, and the shutter mechanism may further include a driving device 40 for driving the synchronizer ring 20. The synchronizer ring 20 and the driving device 40 may be provided on a first side of the shutter base 10, and the driving device 40 is in a transmission connection with the synchronizer ring 20 and drives the synchronizer ring 20 to rotate relative to the shutter base 10. The blade assembly 30 may be provided on a second side of the shutter base 10, and the blade assembly 30 is in a transmission connection with the synchronizer ring 20.

In some exemplary embodiments, the synchronizer ring 20 may be provided to surround the exposure opening 11. In some exemplary embodiments, a plurality of driving devices 40 and a plurality of blade assemblies 30 may be provided to surround the exposure opening 11. The driving devices 40 synchronously drive the synchronizer ring 20 to rotate, and the synchronizer ring 20 may drive each blade assembly 30 to rotate relative to the shutter base 10, so as to close or open the exposure opening 11. The blade assembly 30 may be driven to rotate towards or away from the exposure opening 11 by the synchronizer ring 20, such that the exposure opening 11 is in an open state when the synchronizer ring 20 is located at the first position; when the synchronizer ring 20 is located at the second position, the exposure opening 11 is in a closed state, and in this case, the braking member may decelerate the shutter mechanism to reduce an impact force applied to the shutter mechanism.

Figure 4:
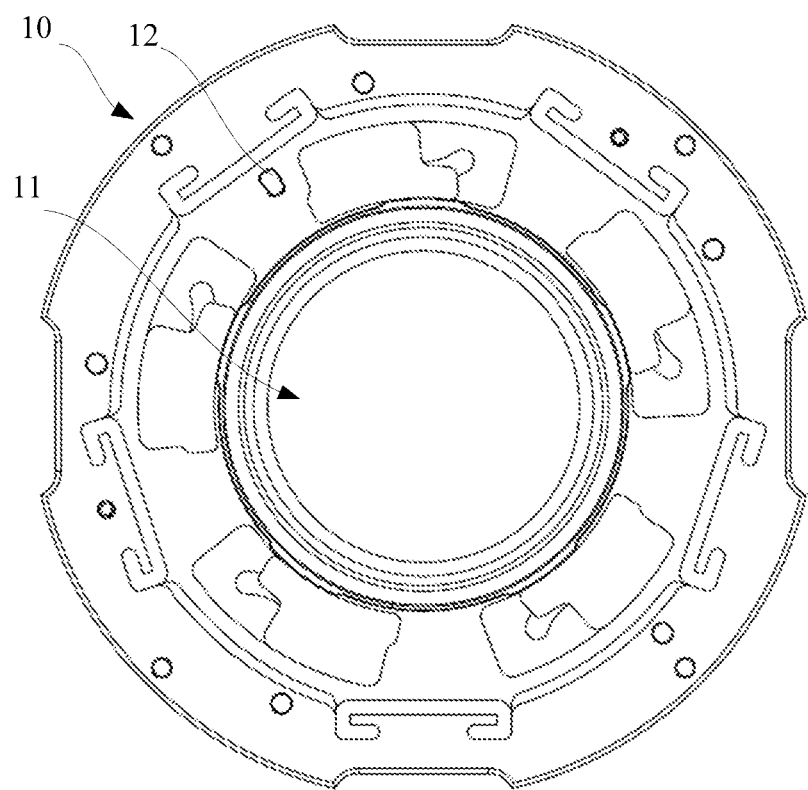
FIG. 4 is a front view of a shutter base according to some exemplary embodiments of the present disclosure.
Figure 5:
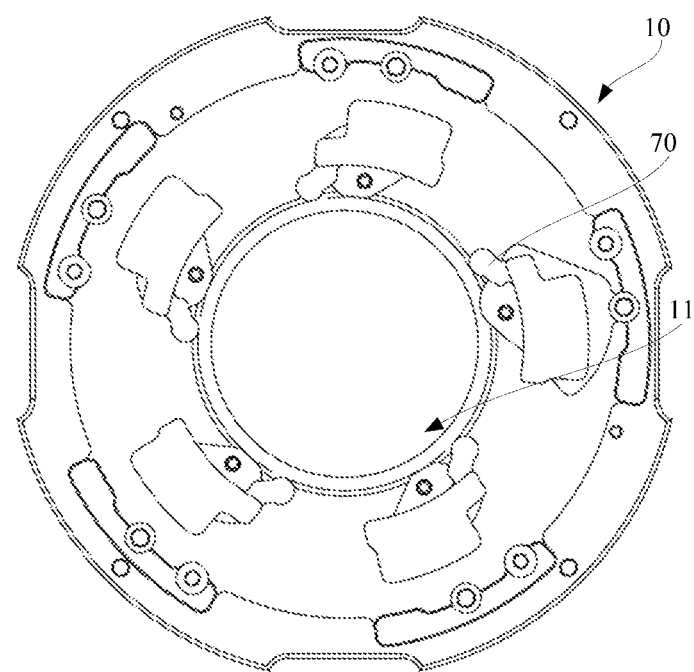
FIG. 5 is a rear view of a shutter base according to some exemplary embodiments of the present disclosure.

Specifically, as shown in FIGS. 4 and 5, in some exemplary embodiments, the shutter base 10 may be a circular mounting plate, and a circular through hole is provided at a center of the circular mounting plate to form the exposure opening 11. An annular slot or an annular flange, or the like, for mounting the shutter mechanism is provided on a side of the shutter base 10 facing the shutter mechanism; an annular slot is in some exemplary embodiments provided for the shutter base 10 to reduce a mounting space of the shutter base 10.

Figure 6:
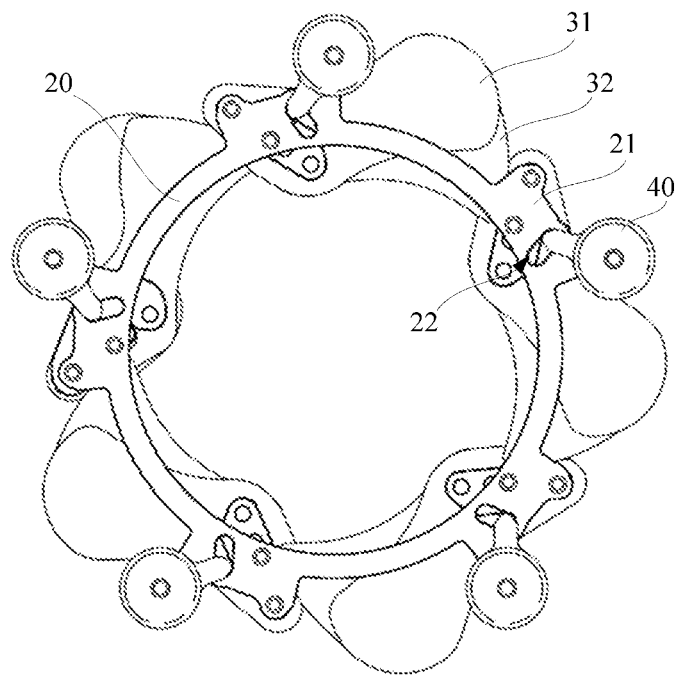
FIG. 6 is a front view of a shutter mechanism according to some exemplary embodiments of the present disclosure.
Figure 7:
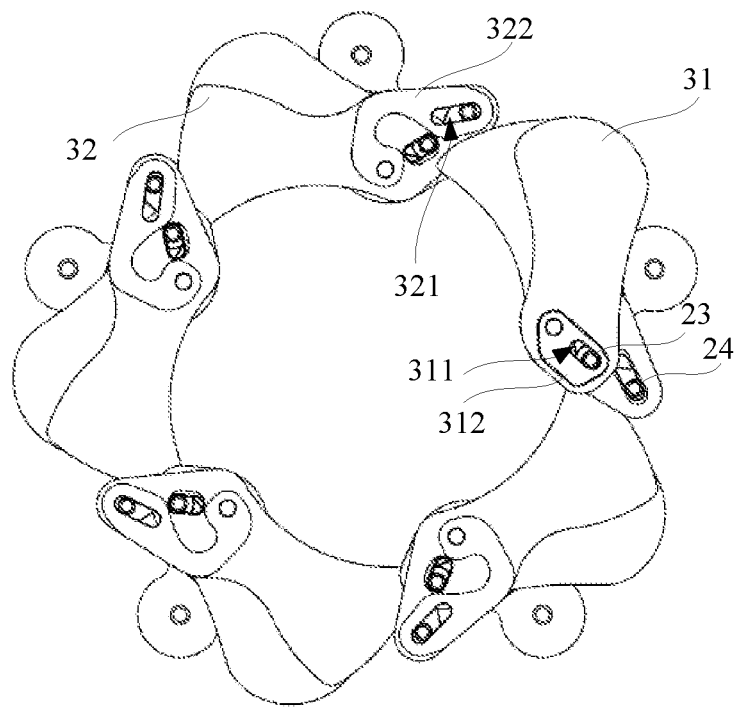
FIG. 7 is a rear view of a shutter mechanism according to some exemplary embodiments of the present disclosure.

As shown in FIGS. 6 and 7, the shutter mechanism may include the synchronizer ring 20, the plurality of blade assemblies 30, and the plurality of driving devices 40, the synchronizer ring 20 may be provided on the first side of the shutter base 10, and the synchronizer ring 20 is mounted in an annular mounting slot of the shutter base 10. The plurality of driving devices 40 are all located on the first side of the shutter base 10, and the plurality of driving devices 40 may be evenly distributed on the synchronizer ring 20 circumferentially; the plurality of driving devices 40 are in transmission connection with the synchronizer ring 20, and may synchronously drive the synchronizer ring 20 to rotate relative to the shutter base 10.

The driving device 40 may include a driving shaft, the synchronizer ring 20 is provided with a driving slide slot 22 fitted with the driving shaft, and the driving shaft may be fitted with the driving slide slot 22 to swing and drive the synchronizer ring 20 to rotate; meanwhile, the driving shaft may also slide in the driving slide slot 22. As driven by the driving device 40, the synchronizer ring 20 may rotate relative to the exposure opening 11, and a rotation axis of the synchronizer ring 20 coincides with a center line of the exposure opening 11.

Each blade assembly 30 is provided on the second side of the shutter base 10, and each blade assembly 30 may include at least one blade. In some exemplary embodiments, in order to reduce a rotation range of each blade, the blade assembly 30 may rapidly close the exposure opening 11; the plurality of blade assemblies 30 are connected to the synchronizer ring 20, each blade assembly 30 may include a first blade 31 and a second blade 32 which are hinged together, and the first blade 31 and the second blade 32 may be driven to rotate relative to the shutter base 10 by the synchronizer ring 20. When the synchronizer ring 20 is located at the first position, the first blade 31 and the second blade 32 are both located outside the exposure opening 11, and the exposure opening 11 is thus opened. When the synchronizer ring 20 is located at the second position, the first blade 31 and the second blade 32 together cover the exposure opening 11, and the exposure opening 11 is thus closed.

For example, the synchronizer ring 20 is provided with five blade assemblies 30, four of which are mounted on the synchronizer ring 20 in a first state (forwardly mounted) and one of which is mounted on the synchronizer ring 20 in a second state (reversely mounted); such an arrangement may avoid collision among the blades when the exposure opening is closed. When the blade assembly 30 is forwardly mounted on the synchronizer ring 20, the first blade 31 is provided close to the second side of the shutter base 10 and the second blade 32 is located on a side of the first blade 31 apart from the shutter base 10. When the blade assembly 30 is reversely mounted on the synchronizer ring 20, the second blade 32 is provided close to the second side of the shutter base 10 and the first blade 31 is located on a side of the second blade 32 apart from the shutter base 10. The blades of all the blade assemblies 30 provided on the synchronizer ring 20 are located at different planes to prevent the blades from interfering with each other during rotation, thereby ensuring that the blade assemblies 30 fully close the exposure opening 11.

A side of the synchronizer ring 20 facing the blade assemblies 30 is in transmission connection with the blade assemblies 30 and drives each blade assembly 30; the side of the synchronizer ring 20 facing the blade assembly 30 is provided with a first driving shaft 23 and a second driving shaft 24, the first blade 31 is in transmission connection with the first driving shaft 23 via a first connecting member provided thereon, and the second blade 32 is in transmission connection with the second driving shaft 24 via a second connecting member provided thereon. While the synchronizer ring 20 rotates, the first blade 31 is driven to rotate by the first driving shaft 23, and the second blade 32 is driven to rotate by the second driving shaft 24.

Exemplarily, the first connecting member may be a first driving slot or a first driving hole 311 provided on the first blade 31, and the first driving shaft 23 is slidably provided in the first driving slot or the first driving hole 311; similarly, the second connecting member may be a second driving slot or a second driving hole 321 provided in the second blade 32, and the second driving shaft 24 is slidably provided in the second driving slot or the second driving hole 321.

Further, for example, if the first connecting member is the first driving hole 311 and the second connecting member is the second driving hole 321, the first driving hole 311 provided on the first blade 31 extends in a direction perpendicular to a rotation axis of the first blade 31, such that the first driving shaft 23 may slide in the first driving hole 311 on the first blade 31 while rotating. The second driving hole 321 provided in the second blade 32 extends in a direction perpendicular to a rotation axis of the second blade 32, such that the second driving shaft 24 may slide in the second driving hole 321 in the second blade 32 while rotating.

To enhance structural strength of the first blade 31 and the second blade 32, so as to prevent the first blade 31 and the second blade 32 from being broken and improve a reliability of the blade assembly 30, in some exemplary embodiments, a first reinforcing sheet 312 is provided on a back side of the first blade 31, the first reinforcing sheet 312 is provided at an edge of the first blade 31 and located in a region where the first driving hole 311 is located, the first reinforcing sheet 312 may cover the region where the first driving hole 311 is located, and the first reinforcing sheet 312 is provided with a through hole communicated with the first driving hole 311. Similarly, a second reinforcing sheet 322 is provided on a back side of the second blade 32, the second reinforcing sheet 322 is provided at an edge of the second blade 32 and located in a region where the second driving hole 321 is located, the second reinforcing sheet 322 may cover the region where the second driving hole 321 is located, and the second reinforcing sheet 322 is provided with a through hole communicated with the second driving hole 321.

As shown in FIG. 3, the braking member in some exemplary embodiments may include at least one of a braking ring 50, a friction member 60, and a biasing member 70; in some exemplary embodiments, the braking ring 50 and the friction member 60 may be provided on a same side; for example, the braking ring 50 and the friction member 60 are provided on the first side of the shutter base 10 and the biasing member 70 is provided on the second side of the shutter base 10.

Figure 8:
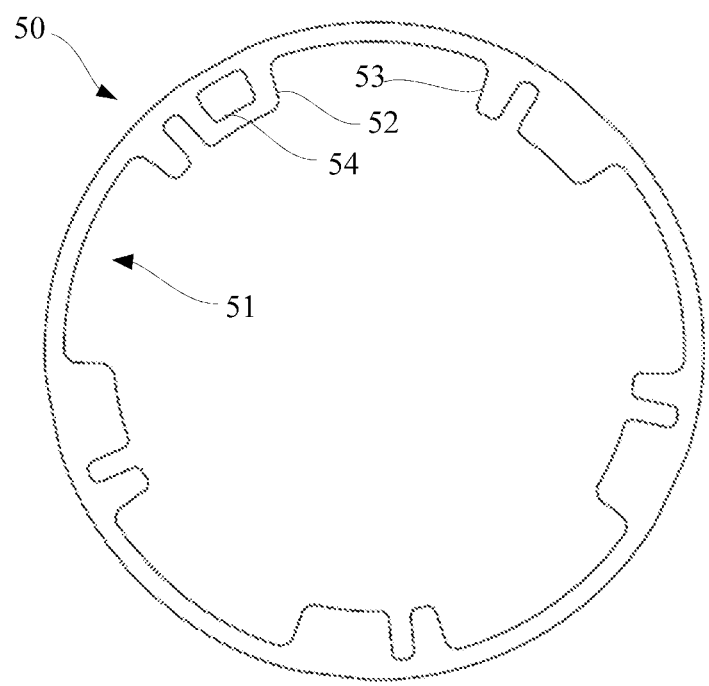
FIG. 8 is a front view of a braking ring according to some exemplary embodiments of the present disclosure.

Specifically, as shown in FIGS. 8 and 1, the braking member in some exemplary embodiments may include the braking ring 50 for decelerating the shutter mechanism by restricting a position of the synchronizer ring 20. In some exemplary embodiments, the braking ring 50 may be made of a plastic material and has a certain elasticity, such that when the braking ring 50 collides with the synchronizer ring 20 (that is, the braking ring 50 limits the position of the synchronizer ring 20), a part of momentum transferred from the synchronizer ring 20 to the braking ring 50 may be absorbed, thereby decelerating the shutter mechanism.

For example, the braking ring 50 may be located on the first side of the shutter base 10; that is, the braking ring 50 and the synchronizer ring 20 are located on a same side of the shutter base 10; the braking ring 50 is provided around the exposure opening 11, the braking ring 50 is located on a side of the synchronizer ring 20 apart from the exposure opening 11, and the braking ring 50 may be provided coaxially with the synchronizer ring 20 and the exposure opening 11; that is, the braking ring 50 may be sleeved over the side of the synchronizer ring 20 apart from the exposure opening 11, and the braking ring 50, the synchronizer ring 20 and the exposure opening 11 are coaxial. It may be understood that the braking ring 50 in some exemplary embodiments may also be arranged on a side of the synchronizer ring 20 close to the exposure opening 11; that is, the braking ring 50 is provided in the synchronizer ring 20; in some exemplary embodiments, the braking ring 50, the synchronizer ring 20, and the exposure opening 11 may not be provided coaxially.

As shown in FIGS. 6 and 8, the synchronizer ring 20 may include a limiting protrusion 21 movable between the first position and the second position. The braking ring 50 may include a first limiting portion 52 and a second limiting portion 53 which are spaced apart from each other, the synchronizer ring 20 is movable between the first limiting portion 52 and the second limiting portion 53, the first limiting portion 52 corresponds to the first position, and the second limiting portion 53 corresponds to the second position. In some exemplary embodiments, the first limiting portion 52 and the second limiting portion 53 may be protrusions formed on a surface of the braking ring 50. The limiting protrusion 21 is fitted with the first limiting portion 52 and the second limiting portion 53. In some exemplary embodiments, the synchronizer ring 20 has a limiting protrusion 21 protruding outwards in a radial direction thereof, and the limiting protrusion 21 is insertable between the first limiting portion 52 and the second limiting portion 53.

When the synchronizer ring 20 rotates relative to the shutter base 10, the limiting protrusion 21 may rotate between the first limiting portion 52 and the second limiting portion 53, and the limiting protrusion 21 may abut against the first limiting portion 52; in this case, the synchronizer ring 20 is located at the first position; when the limiting protrusion 21 abuts against the second limiting portion 53, the synchronizer ring 20 is located at the second position. When the synchronizer ring 20 is located at the second position, the blade assembly 30 covers the exposure opening 11 and the exposure opening 11 is thus closed.

In some exemplary embodiments, the synchronizer ring 20 contacts the braking ring 50 and may drive the braking ring 50 to rotate relative to the shutter base 10; that is, a part of the momentum of the synchronizer ring 20 may be transmitted to the braking ring 50, such that the shutter mechanism may be braked and decelerated for the first time, thus reducing the impact force applied to the shutter mechanism when the exposure opening 11 is closed.

In addition, the closer a ratio of inertia of the braking ring 50 to the synchronizer ring 20 is to 1, the better a braking effect is, but the larger the impact force applied to the shutter mechanism is; the closer the ratio of inertia of the braking ring 50 to the synchronizer ring 20 is to 0, the smaller the impact force applied to the shutter mechanism is, but the poorer the braking and decelerating effect is. Therefore, in some exemplary embodiments, the inertia of the braking ring 50 and the inertia of the synchronizer ring 20 may have a ratio ranging from 0.1 to 0.4; in some exemplary embodiments, the ratio is set to 0.2, such that the braking and decelerating effect can be better, and meanwhile, a small impact force is applied to the shutter mechanism, thus avoiding damage to the shutter mechanism.

In some exemplary embodiments, the braking ring 50 is provided with at least one limiting slot 51 along a circumferential direction thereof; that is, one or more limiting slots 51 may be provided on the braking ring 50; in order to improve the decelerating effect of the braking ring 50 on the synchronizer ring 20, in some exemplary embodiments, a plurality of limiting slots 51 are provided on the braking ring 50, and the plurality of limiting slots 51 are arranged on the braking ring 50 at equal intervals along the circumferential direction of the braking ring 50.

The limiting slot 51 may be an arc-shaped slot, and each limiting slot 51 extends in a direction coincident with the circumferential direction of the braking ring 50. The limiting slot 51 is located at an edge of a side of the braking ring 50 towards the synchronizer ring 20, a slot opening is provided at an end of the limiting slot 51 towards the synchronizer ring 20, and the slot opening is fitted with the limiting protrusion 21 of the synchronizer ring 20, such that the limiting protrusion 21 of the synchronizer ring 20 may be inserted into the limiting slot 51 through the slot opening, and therefore, the limiting protrusion 21 may move in the limiting slot 51 through the slot opening.

The first limiting portion 52 and the second limiting portion 53 of the braking ring 50 are formed on two end surfaces of the limiting slot 51 respectively, and when the driving device 40 drives the synchronizer ring 20 to rotate relative to the shutter base 10, the limiting protrusion 21 abuts against a first end surface of the limiting slot 51, and at this point, the synchronizer ring 20 is located at the first position, and the exposure opening 11 is in the open state; the limiting protrusion 21 rotates to abut against a second end surface of the limiting slot 51, and at this point, the synchronizer ring 20 is located at the second position, and the exposure opening 11 is in the closed state. It may be understood that the limiting protrusions 21 of the synchronizer ring 20, the limiting slots 51 of the braking ring 50, the blade assemblies 30 and the driving devices 40 may have a same number; the driving slide slot 22, the first driving shaft 23, and the second driving shaft 24 of the synchronizer ring 20 may be provided on the limiting protrusion 21.

Further, the braking ring 50 is rotatably provided on the shutter base 10. In order to limit a moving range of the braking ring 50, the braking ring 50 is further provided with a limiting hole 54, the limiting hole 54 may be an arc-shaped hole, and an extending direction of the limiting hole 54 needs to be consistent with a rotating direction of the braking ring 50 (that is, the limiting hole 54 is provided along the circumferential direction of the braking ring 50). The shutter base 10 is provided with a limiting block 12 inserted into the limiting hole 54. In some exemplary embodiments, the limiting block 12 may be fixedly provided on a side surface facing the braking ring 50, the limiting block 12 is fitted with the limiting hole 54, the limiting block 12 may be inserted into the limiting hole 54, the braking ring 50 may rotate relative to the limiting block 12, and two end surfaces of the limiting hole 54 may abut against the limiting block 12 in different strokes, so as to limit the moving range of the braking ring 50.

Figure 9:
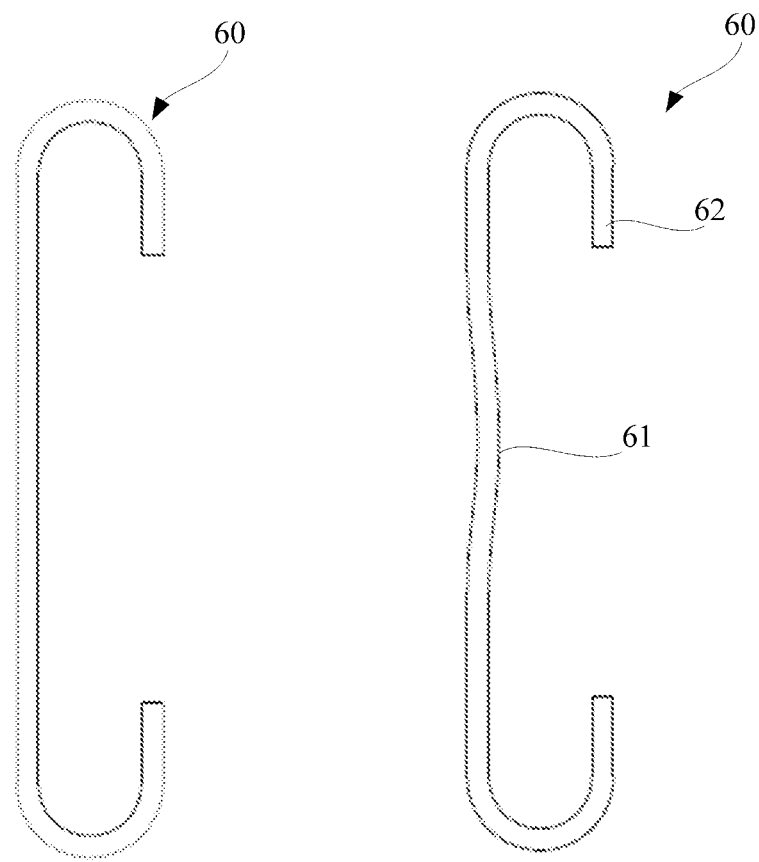
FIG. 9 is a schematic diagram of a friction member in an uncompressed state and a compressed state according to some exemplary embodiments of the present disclosure.

As shown in FIGS. 9 and 1, the braking member in some exemplary embodiments may further include the friction member 60, and the friction member 60 may generate a pressure through deformation to provide a frictional resistance, so as to decelerate the shutter mechanism; that is, the friction member 60 decelerates the shutter mechanism by friction.

Specifically, in some exemplary embodiments, the shutter base 10 is provided with a circumferential surface for mounting the braking ring 50, and the circumferential surface is provided around the exposure opening 11 and is coaxial with the exposure opening 11; a radius of the circumferential surface is greater than a radius of the exposure opening 11 to form a mounting space for the braking ring 50. For example, the circumferential surface may be formed by the annular flange provided on the shutter base 10; or, a radius of the annular mounting slot provided in the shutter base 10 and configured to mount the synchronizer ring 20 is increased, and the braking ring 50 and the synchronizer ring 20 may be mounted in the annular mounting slot together; that is, a slot wall of the enlarged annular mounting slot forms the circumferential surface to provide a mounting space for the braking ring 50 and the synchronizer ring 20.

In some exemplary embodiments, the braking ring 50 may be provided between the synchronizer ring 20 and the circumferential surface of the shutter base 10, and the friction member 60 may be provided between the circumferential surface of the shutter base 10 and the braking ring 50. The friction member 60 may be an elastic friction plate, the friction member 60 may be provided on the braking ring 50 and rotate with the braking ring 50, and the friction member 60 contacts the circumferential surface, such that when the braking ring 50 rotates relative to the shutter base 10, the friction member 60 provides a frictional force for the braking ring 50 to decelerate the braking ring 50. In some exemplary embodiments, the braking ring 50 rotates synchronously with the synchronizer ring 20, and when the braking ring 50 decelerates, the synchronizer ring 20 correspondingly decelerates; that is, the shutter mechanism may be braked and decelerated for the second time with the friction member 60, so as to further reduce the impact force applied to the shutter mechanism when the exposure opening 11 is closed.

In addition, the friction member 60 may be provided on the shutter base 10; that is, the friction member 60 may be provided on the circumferential surface, and one side of the friction member 60 contacts the braking ring 50 and provides the frictional force for the braking ring 50. The friction member 60 may be fixed on the circumferential surface, and a side of the friction member 60 facing the braking ring 50 is attached to a surface of the braking ring 50; for example, the friction member 60 may be bonded to the circumferential surface, and one side of the friction member 60 is attached to the surface of the braking ring 50.

Alternatively, the friction member 60 is detachably mounted on the circumferential surface; that is, the friction member 60 is detachably mounted on the shutter base 10. Specifically, the friction member 60 may include a friction portion 61 and hook-shaped portions 62 located at two ends of the friction portion 61, a mounting slot fitted with the hook-shaped portion 62 is provided at a position of the shutter base 10 close to the circumferential surface, the hook-shaped portion 62 may be snapped into the mounting slot, and the friction portion 61 faces the braking ring 50 and is attached to the braking ring 50. For example, the friction member 60 may be an elastic friction plate, two ends of the friction plate are bent to form the hook-shaped portions 62, and the hook-shaped portion 62 may have an L shape; correspondingly, the shutter base 10 is provided with an L-shaped mounting slot; that is, the friction plate is detachably mounted to the shutter base 10 by the hook-shaped portion 62.

In some exemplary embodiments, the friction member 60 may be directly fixed to the braking ring 50, the friction member 60 has one side mounted and attached to the braking ring 50, and the other side thereof attached to the circumferential surface of the shutter base 10, such that when the braking ring 50 rotates relative to the circumferential surface, the friction force generated between the friction member 60 and the circumferential surface may decelerate the braking ring 50.

No matter how the friction member 60 is arranged between the braking ring 50 and the shutter base 10, in some exemplary embodiments, a plurality of friction members 60 may be provided between the braking ring 50 and the shutter base 10 as needed, the plural friction members 60 are provided at equal intervals along the circumferential surface, and the friction members 60 and the limiting slots 51 of the braking ring 50 are staggered, such that large friction displacement is provided for the braking ring 50, so as to improve the decelerating effect of the friction member 60 on the braking ring 50.

Further, in some exemplary embodiments, the friction member 60 may be directly provided on the synchronizer ring 20, and when the synchronizer ring 20 is located at the second position, the exposure opening 11 is in the closed state, and the friction member 60 provides a friction force for the synchronizer ring 20 to decelerate the synchronizer ring 20, so as to reduce the momentum of the entire shutter mechanism, thereby reducing the impact force applied to the shutter mechanism when the exposure opening 11 is closed.

For example, the friction member 60 may be an elastic friction plate provided on a bottom surface of the synchronizer ring 20 facing the shutter base 10, and a surface of the shutter base 10 close to the second position may be provided with a protrusion; when the synchronizer ring 20 is located at the second position, a surface of the protrusion may contact a surface of the friction member 60 to generate a frictional force, so as to decelerate the synchronizer ring 20. Certainly, this solution may be used independently, or in conjunction with the above solution in which the friction member 60 is provided between the circumferential surface and the braking ring 50, which is not limited herein.

Figure 10:
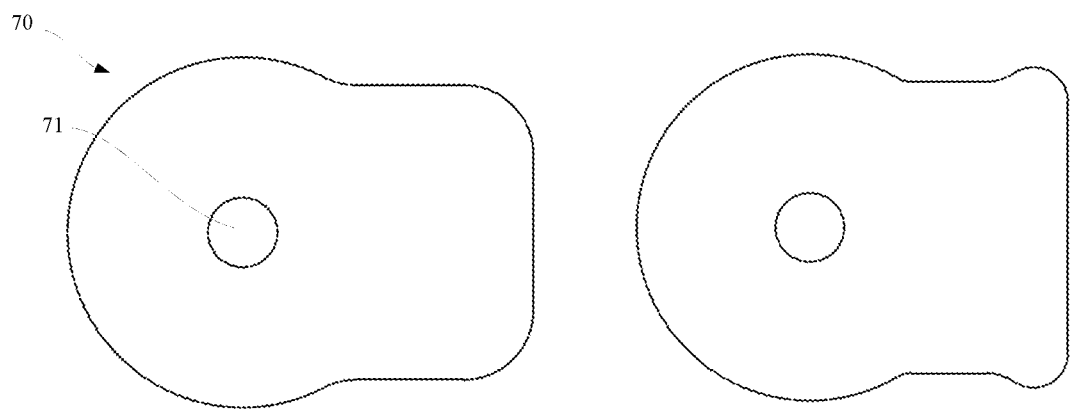
FIG. 10 is a schematic diagram of a biasing member in an uncompressed state and a compressed state according to some exemplary embodiments of the present disclosure.

As shown in FIGS. 10 and 3, the braking member in the embodiment of the present disclosure may further include one or more biasing members 70, the biasing members 70 decelerates the shutter mechanism through biasing displacement. In some exemplary embodiments, the biasing member 70 may be an elastic block, and the biasing member 70 is provided on the shutter base 10, such that when the synchronizer ring 20 is located at the second position, the exposure opening 11 is closed, and the biasing member 70 is biased to displace (that is, deformed) and may absorb a part of the momentum of the shutter mechanism to decelerate the shutter mechanism.

Specifically, the biasing member 70 is mounted on the shutter base 10, the shutter base 10 is provided with a positioning shaft configured to be inserted into the biasing member 70, the biasing member 70 is provided with a mounting hole 71 fitted with the positioning shaft, and a positioning hole is in clearance fit with the positioning shaft; the biasing member 70 is fitted over the positioning shaft through the mounting hole 71, and the biasing member 70 and the positioning shaft do not rotate relative to each other. It may be appreciated that the biasing member 70 may include an abutment surface, and the abutment surface may be arranged opposite to a component against which the abutment surface abuts, and ensure that the biasing member 70 abuts against the abutting component with which the biasing member is fitted; further, a shape of the abutment surface may be adapted to a shape of the component against which the abutment surface abuts.

Figure 11:
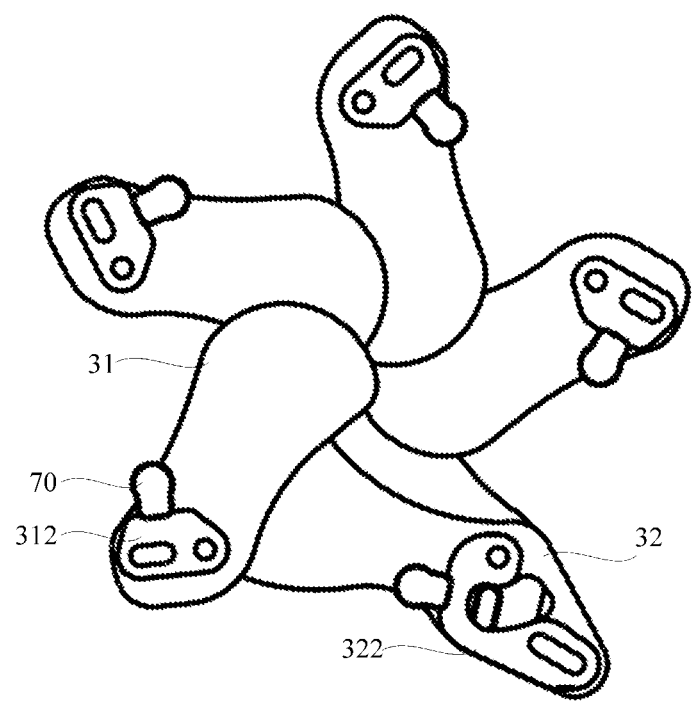
FIG. 11 is a schematic diagram in which the biasing member abuts against each blade assembly according to some exemplary embodiments of the present disclosure.
Figure 12:
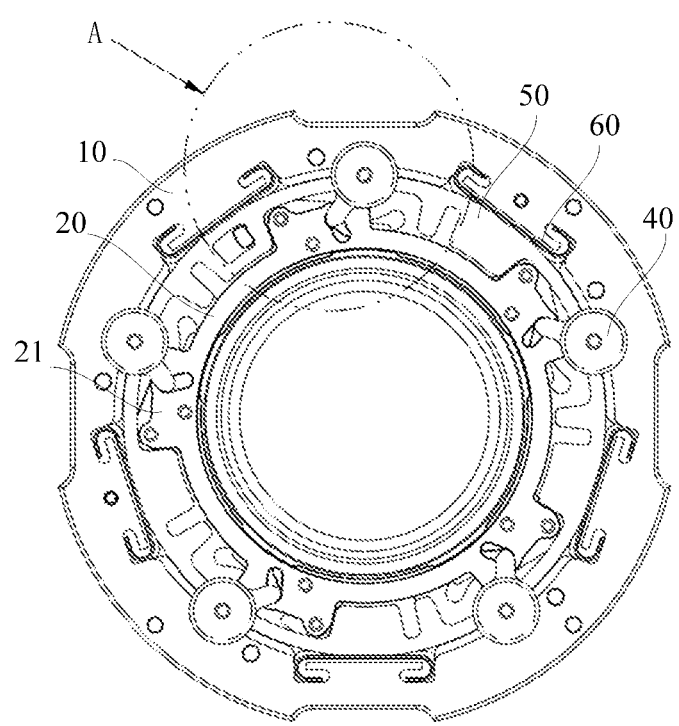
FIG. 12 is a front view of the shutter mechanism in an initial position according to some exemplary embodiments of the present disclosure.
Figure 13:
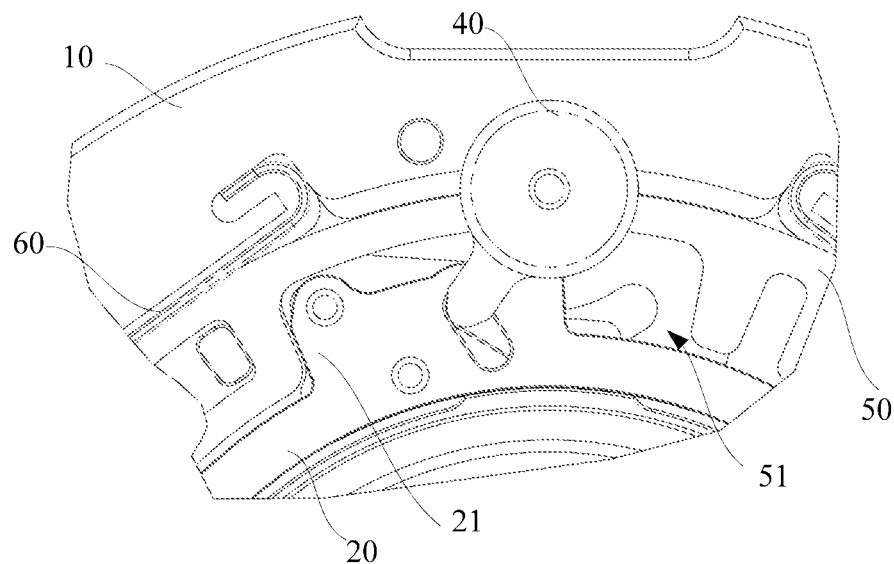
FIG. 13 is a schematic enlarged diagram of portion A in FIG. 12.
Figure 14:
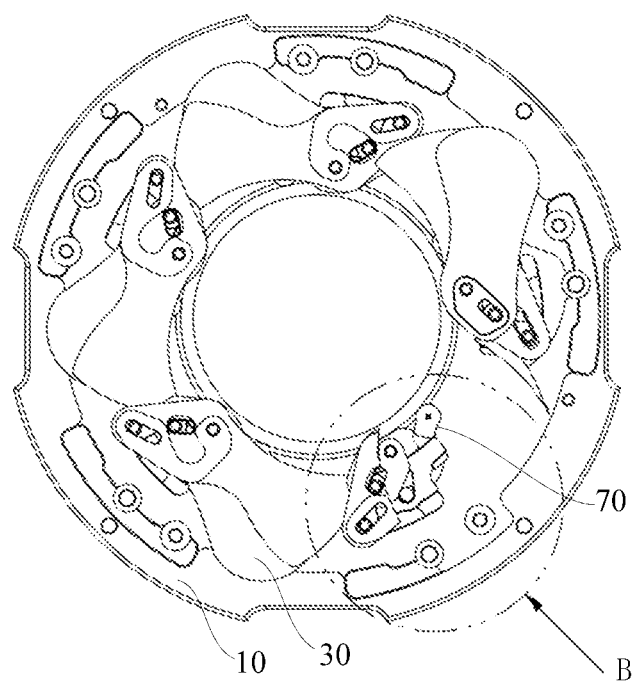
FIG. 14 is a rear view of a shutter mechanism in an initial position according to some exemplary embodiments of the present disclosure.
Figure 15:
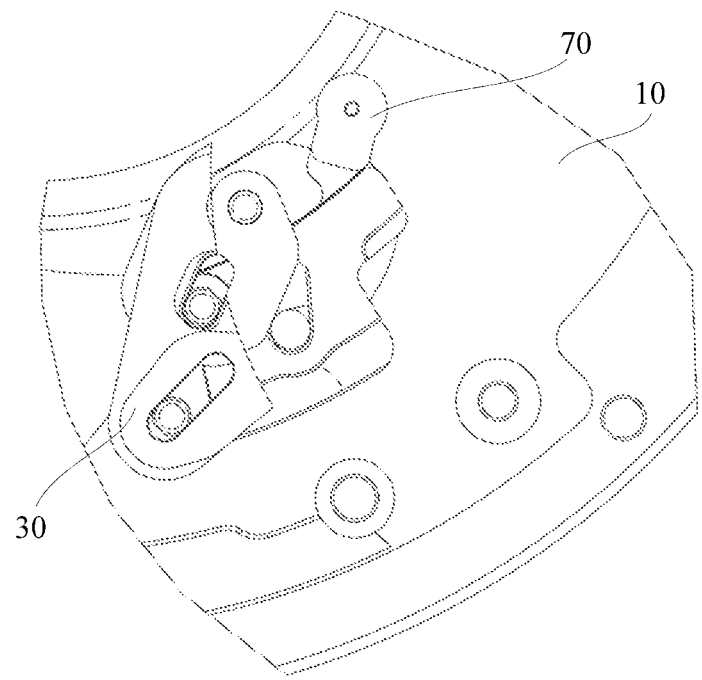
FIG. 15 is a schematic enlarged diagram of portion B in FIG. 14.
Figure 16:
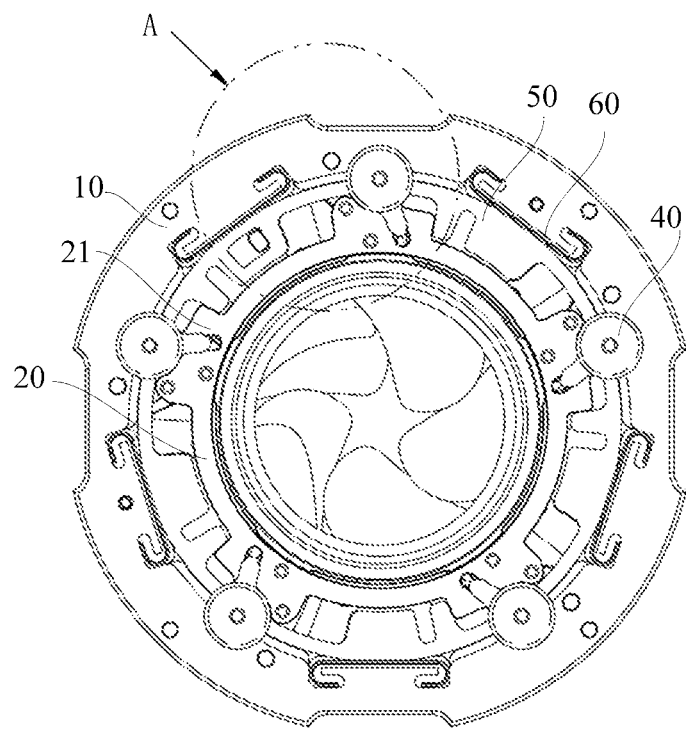
FIG. 16 is a front view of a shutter mechanism during a first deceleration according to some exemplary embodiments of the present disclosure.
Figure 17:
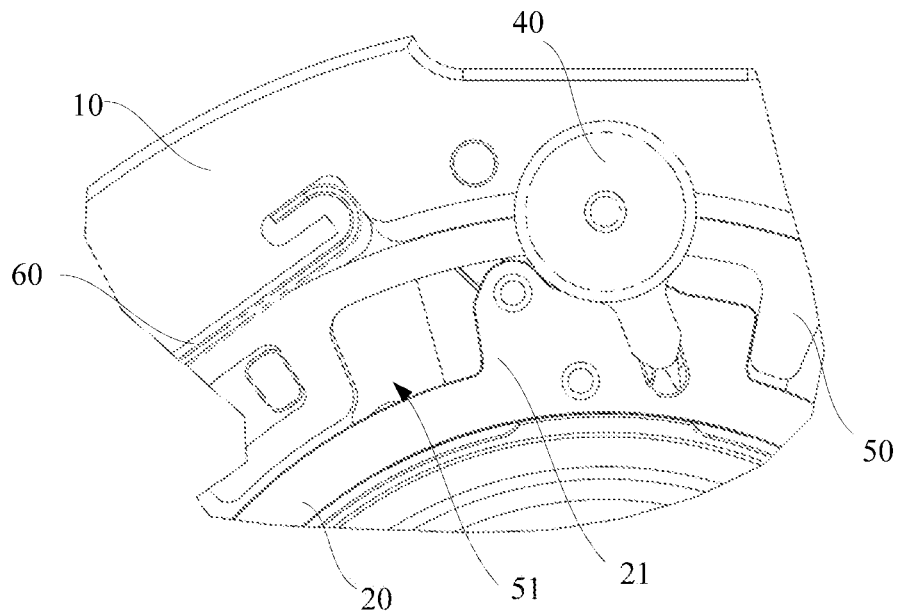
FIG. 17 is a schematic enlarged diagram of portion A in FIG. 16.
Figure 18:
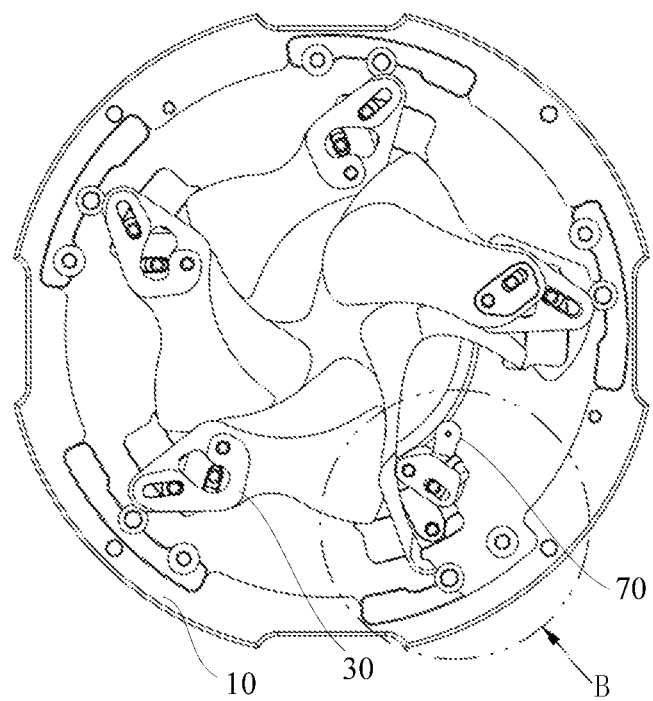
FIG. 18 is a rear view of the shutter mechanism during the first deceleration according to some exemplary embodiments of the present disclosure.
Figure 19:
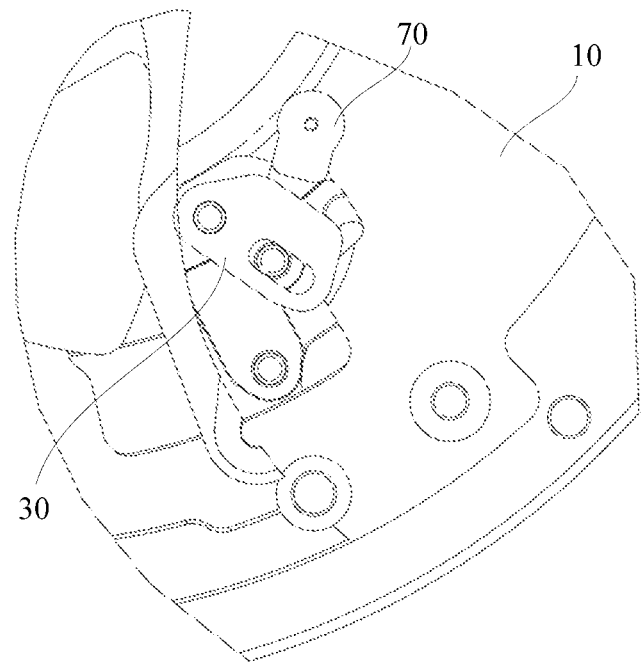
FIG. 19 is a schematic enlarged diagram of portion B in FIG. 18.
Figure 20:
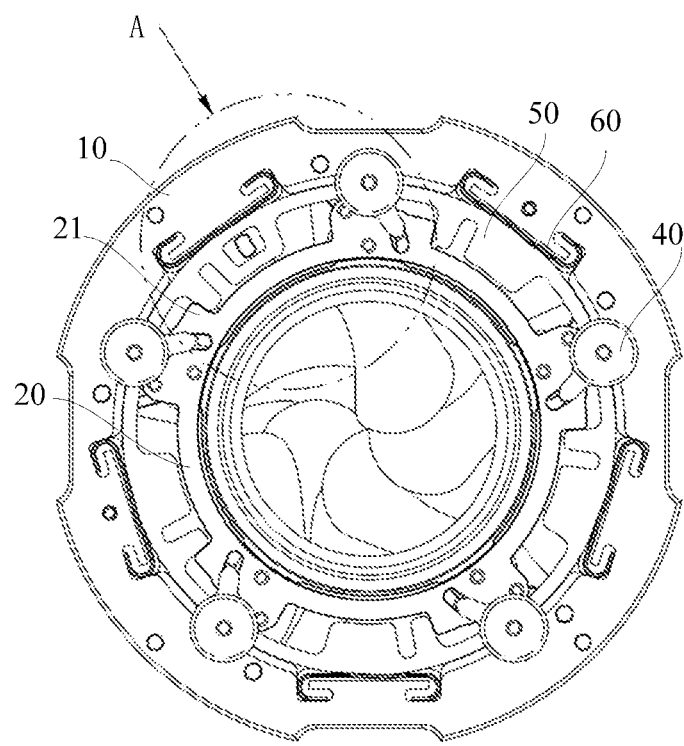
FIG. 20 is a front view of a shutter mechanism during a second deceleration according to some exemplary embodiments of the present disclosure.
Figure 21:
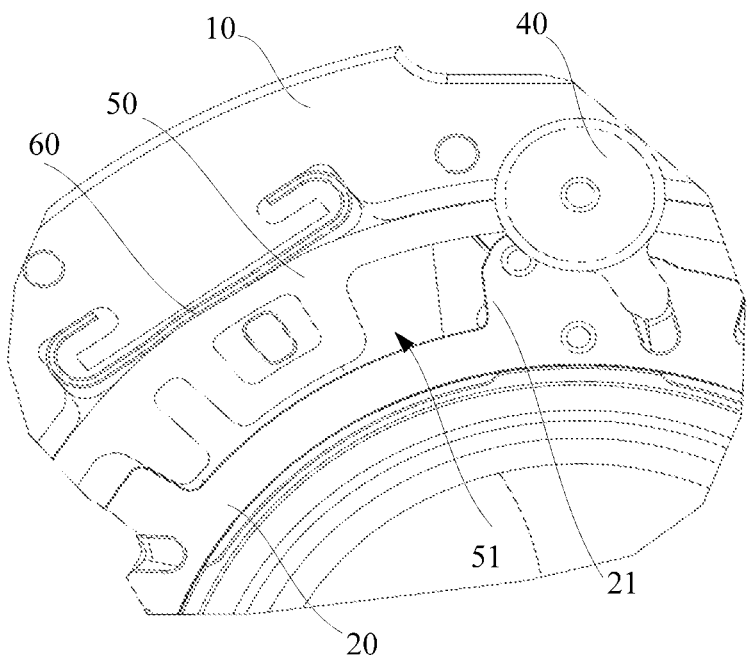
FIG. 21 is a schematic enlarged diagram of portion A in FIG. 20.
Figure 22:
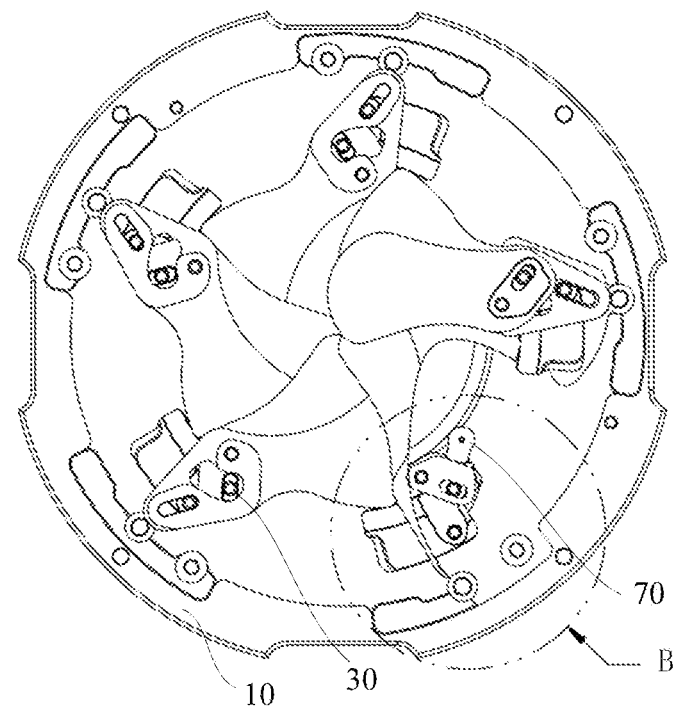
FIG. 22 is a rear view of a shutter mechanism during a second deceleration according to some exemplary embodiments of the present disclosure.
Figure 23:
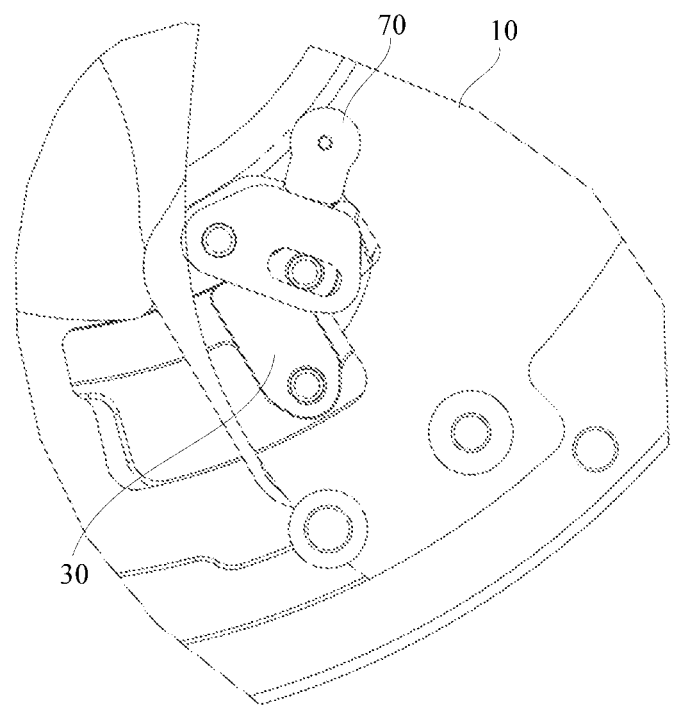
FIG. 23 is a schematic enlarged diagram of portion B in FIG. 22.
Figure 24:
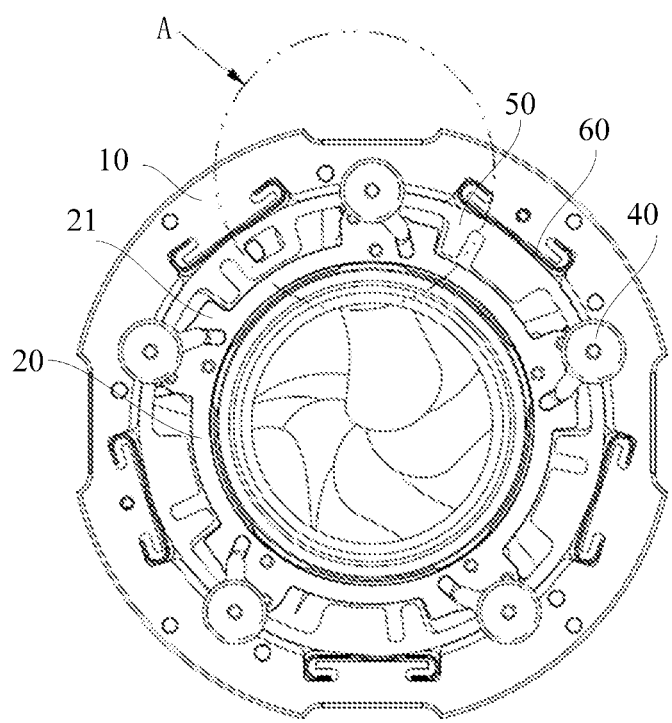
FIG. 24 is a front view of a shutter mechanism during a third deceleration according to some exemplary embodiments of the present disclosure.
Figure 25:
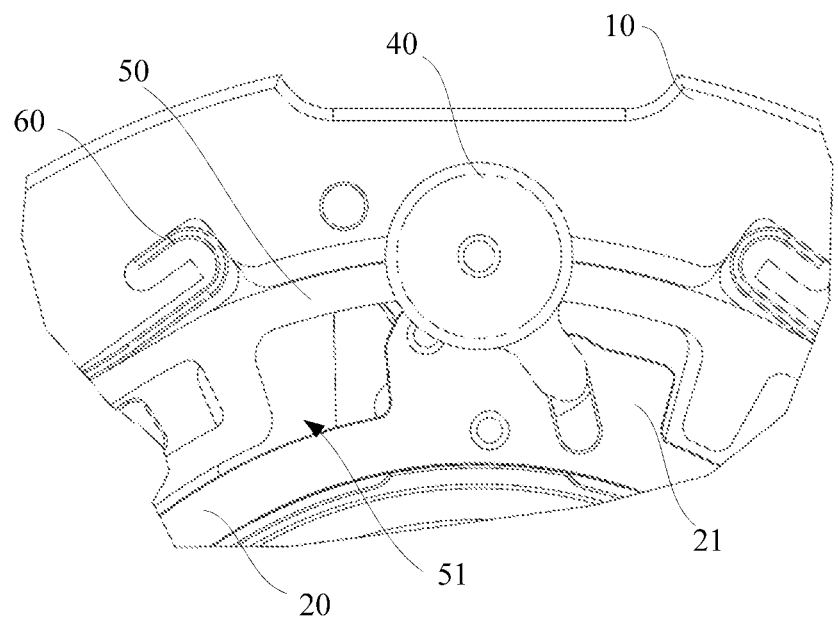
FIG. 25 is a schematic enlarged diagram of portion A in FIG. 24.
Figure 26:
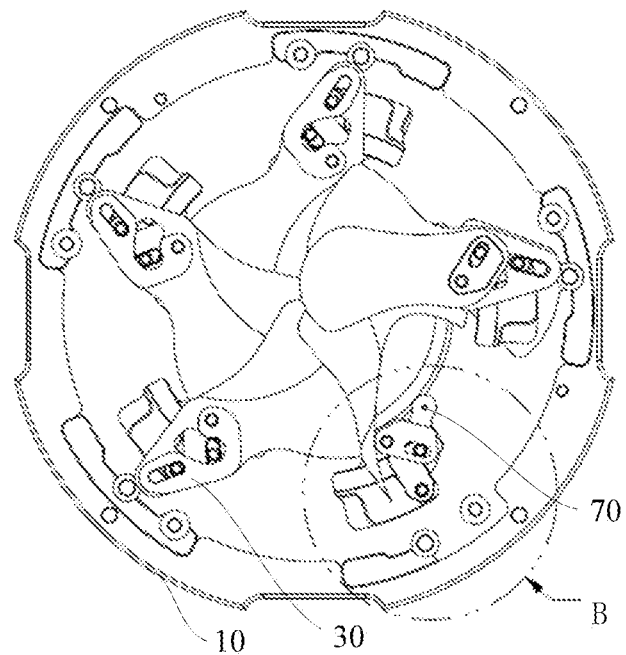
FIG. 26 is a rear view of a shutter mechanism during a third deceleration according to some exemplary embodiments of the present disclosure.
Figure 27:
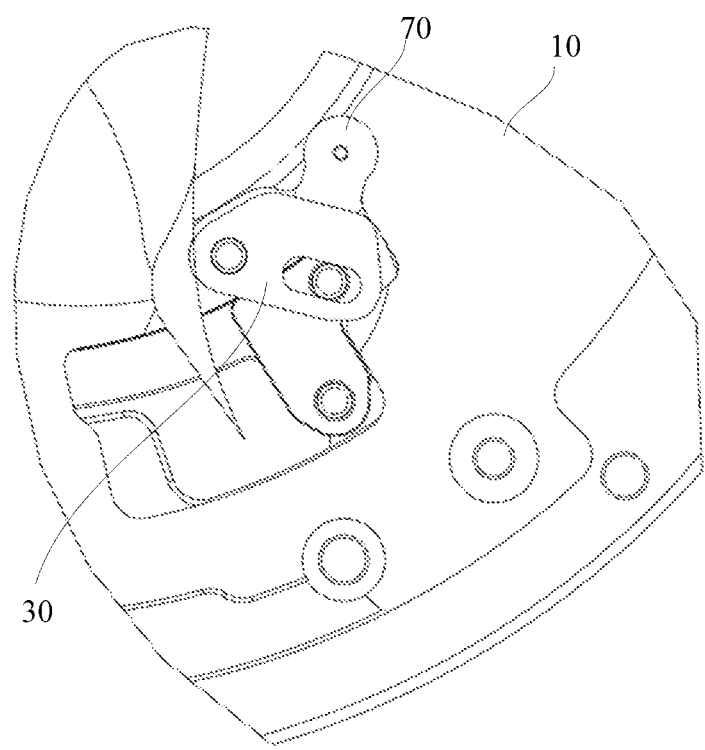
FIG. 27 is a schematic enlarged diagram of portion B in FIG. 26.

As shown in FIG. 11, a plurality of biasing members 70 may be provided on the second side of the shutter base 10, and the plurality of biasing members 70 may be arranged at equal intervals in the circumferential direction of the shutter base 10; specifically, the plurality of biasing members 70 are provided near the exposure opening 11, and the plurality of biasing members 70 may be arranged along the circumferential direction of the exposure opening 11. One biasing member 70 is provided corresponding to each blade assembly 30, some biasing members 70 correspond to the first reinforcing sheets 312 on the first blades 31 of the forward blade assemblies, and some biasing members 70 correspond to the second reinforcing sheets 322 of the second blades 32 of the reverse blade assemblies.

When the synchronizer ring 20 is located at the second position, the first blade 31 and the second blade 32 in each blade assembly 30 cover the exposure opening 11, such that the exposure opening 11 is in the closed state; at this point, the second reinforcing sheet 322 of the second blade 32 of the reverse blade assembly 30 abuts against the biasing member 70, and the biasing member 70 is elastically deformed to absorb the momentum of the second blade 32, thereby reducing the impact force of the reverse blade assembly. Similarly, the first reinforcing sheet 312 of the first blade 32 of the forward blade assembly abuts against the biasing member 70, and the biasing member 70 is elastically deformed to absorb the momentum of the first blade 31, thereby reducing the impact force of the forward blade assembly. In some exemplary embodiments, the biasing member 70 abutting against each blade assembly 30 is provided on the second side of the shutter base 10, and the biasing member 70 may absorb part of the momentum of the blade assembly 30 through deformation, so as to reduce the impact force applied to the entire shutter mechanism when the exposure opening 11 is closed.

In some exemplary embodiments, the biasing member 70 may alternatively abut against the synchronizer ring 20 or the braking ring 50 to decelerate the synchronizer ring 20 and the braking ring 50 respectively. Specifically, when the biasing member 70 abuts against the braking ring 50, the biasing member 70 is provided on the shutter base 10 close to the second position, the biasing member 70 and the braking ring 50 are located on a same side, the biasing member 70 may be provided above the limiting slot 51 of the braking ring 50, the first limiting portion 52 of the braking ring 50 may protrude from the surface of the braking ring 50, and the biasing member 70 is located on a rotation path of the first limiting portion 52. When the braking ring 50 rotates relative to the shutter base 10, the first limiting portion 52 abuts against the biasing member 70 by properly setting the position of the biasing member 70 on the shutter base 10, and the biasing member 70 may decelerate the braking ring 50.

In some exemplary embodiments, when the biasing member 70 alternatively abuts against the synchronizer ring 20, the biasing member 70 is provided at a position of the shutter base 10 close to the limiting protrusion 21, the biasing member 70 has an extension portion extending towards a position above the synchronizer ring 20, the synchronizer ring 20 is provided, at the limiting protrusion 21 thereof, with a protruding block opposite to the extension portion, the protruding block is located at an edge of the limiting protrusion 21 and provided near the first position of the braking ring 50, the protruding block is perpendicularly provided on a surface of the limiting protrusion 21 and opposite to the extension portion, and the extension portion is located on a rotation path of the protruding block. When the synchronizer ring 20 rotates relative to the shutter base 10, the protruding block abuts against the extension portion of the biasing member 70, and the biasing member 70 may decelerate the synchronizer ring 20 when the synchronizer ring is located at the second position.

The braking and decelerating process of the shutter mechanism in some exemplary embodiments of the present disclosure will be explained below with reference to the accompanying drawings.

As shown in FIGS. 12 to 15, when the shutter mechanism is at an initial position, the limiting protrusion 21 of the synchronizer ring 20 is located in the limiting slot 51 of the braking ring 50, and the limiting protrusion 21 abuts against the first limiting portion 52 of the limiting slot 51; at this point, each blade assembly 30 is arranged apart from the exposure opening 11, and the exposure opening 11 is in the open state. In this state, the braking ring 50 located at the shutter base 10 is in a stationary state, and the friction member 60 is also in a non-working state; the biasing member 70 provided at the shutter base 10 does not abut against the blade assembly 30, and the biasing member 70 is in a free state.

As the driving device 40 drives the synchronizer ring 20 to rotate relative to the shutter base 10, the limiting protrusion 21 of the synchronizer ring 20 moves in the limiting slot 51; as shown in FIGS. 16 to 19, the limiting protrusion 21 abuts against the second limiting portion 53 of the braking ring 50; that is, the synchronizer ring 20 collides with the braking ring 50, and the shutter mechanism may be braked and decelerated for the first time. A part of the momentum of the synchronizer ring 20 may be transferred to the braking ring 50, such that the synchronizer ring 20 is decelerated to reduce the impact force applied to the synchronizer ring 20. Each blade assembly 30 is driven to rotate towards the exposure opening 11 by the synchronizer ring 20 and covers a part of the exposure opening 11, the friction member 60 enters a working state, and the biasing member 70 provided on the other side of the shutter base 10 does not abut against the blade assembly 30, and is in the free state.

As shown in FIGS. 20 to 23, after the synchronizer ring 20 collides with the braking ring 50, the braking ring 50 receives a part of the momentum of the synchronizer ring 20, such that the braking ring 50 may rotate relative to the shutter base 10 and the shutter mechanism enters a second braking and decelerating process. The friction member 60 located between the braking ring 50 and the shutter base 10 provides the friction force for the braking ring 50, such that the braking ring 50 is decelerated; the synchronizer ring 20 and the braking ring 50 may move together after the collision, thereby reducing a rotation speed of the synchronizer ring 20 so as to reduce the impact force applied to the synchronizer ring 20. In this state, the blade assemblies 30 fully cover the exposure opening 11, the exposure opening 11 is in the closed state, and the biasing member 70 provided on the shutter base 10 and the blade assembly 30 enter an abutting state.

As shown in FIGS. 24 to 27, as the synchronizer ring 20 continuously rotates, the blade assembly 30 continuously rotates towards the exposure opening 11, the blade assembly 30 may abut against the biasing member 70 and deform the biasing member 70, and the biasing member 70 absorbs the momentum of the blade assembly 30 and is elastically deformed, which may reduce a rotation speed of the blade assembly 30 so as to reduce the impact force applied to the blade assembly 30, thereby reducing the impact force applied to the shutter mechanism.

Some exemplary embodiments of the present disclosure further provide a photographing apparatus including the above-mentioned shutter; when the shutter mechanism in the shutter closes the exposure opening 11, a first deceleration may be performed by the braking ring 50, a second deceleration may be performed by the friction member 60, and a third deceleration may be performed by the biasing member 70, thus effectively reducing the impact force applied to the shutter mechanism when the exposure opening 11 is closed, avoiding the damage to the shutter mechanism, and improving a reliability of the shutter mechanism.

Finally, it should be noted that the foregoing exemplary embodiments are merely intended for describing the technical solutions of the present disclosure, rather than limiting the present disclosure. Although the present disclosure is described in detail with reference to the foregoing exemplary embodiments, persons of ordinary skill in the art should understand that they may still make modifications to the technical solutions described in the foregoing exemplary embodiments, or make equivalent replacements to some or all the technical features thereof, without departing from the scope of the technical solutions of the present disclosure.

What is claimed is:

1. A shutter, comprising:
   a shutter base including an exposure opening;

a shutter mechanism including a blade assembly and a synchronizer ring to drive the blade assembly, wherein
the synchronizer ring is movable between a first position and a second position, and
the exposure opening is open when the synchronizer ring is in the first position and closed when the synchronizer ring is in the second position; and a braking member to decelerate the shutter mechanism, wherein
the braking member includes a braking ring to decelerate the shutter mechanism by limiting a position of the synchronizer ring,
the braking ring includes a plurality of limiting portions arranged in a circumferential direction of the braking ring and distributed on the braking ring at equal intervals.

2. The shutter according to claim 1, wherein the synchronizer ring is configured to surround the exposure opening.

3. The shutter according to claim 1, wherein the synchronizer ring includes a limiting protrusion movable between the first position and the second position.

4. The shutter according to claim 1, wherein the braking ring is configured to surround the exposure opening.

5. The shutter according to claim 4, wherein the braking ring is coaxial with the exposure opening and the synchronizer ring.

6. The shutter according to claim 1, wherein the braking ring includes:
a first limiting portion corresponding to the first position, and
a second limiting portion corresponding to the second position and spaced apart from the first limiting portion; and
the synchronizer ring is movable between the first limiting portion and the second limiting portion.

7. The shutter according to claim 6, wherein
the first limiting portion and the second limiting portion are formed on two end surfaces of a plurality of limiting slots in the circumferential direction of the braking ring.

8. The shutter according to claim 7, wherein
a slot opening of each of the plurality of limiting slots faces the synchronizer ring;
the synchronizer ring includes a limiting protrusion configured to move in the plurality of limiting slots through the slot opening.

9. The shutter according to claim 1, wherein
the braking ring includes a limiting hole arranged along the circumferential direction of the braking ring to limit a moving range of the braking ring; and
the shutter base includes a limiting block inserted in the limiting hole.

10. The shutter according to claim 1, wherein the braking member includes at least one friction member to decelerate the shutter mechanism by friction.

11. The shutter according to claim 10, wherein the at least one friction member is arranged on at least one of the shutter base, the braking ring, or the synchronizer ring.

12. The shutter according to claim 10, wherein
the at least one friction members includes a plurality of friction members; and
the plural friction members and a plurality of limiting slots are staggered along the circumferential direction of the braking ring.

13. The shutter according to claim 1, wherein
the braking member includes at least one biasing member to decelerate the shutter mechanism by a biasing displacement.

14. The shutter according to claim 13, wherein the at least one biasing member interacts with at least one of the shutter mechanism, or the braking ring.

15. The shutter according to claim 13, wherein the at least one biasing member is arranged on the shutter base.

16. The shutter according to claim 13, wherein a plurality of biasing members are arranged on the shutter base and at equal intervals along a circumferential direction of the shutter base.

17. A photographing apparatus, comprising:
a shutter including:
a shutter base including an exposure opening,
a shutter mechanism including a blade assembly and a synchronizer ring to drive the blade assembly, wherein
the synchronizer ring is movable between a first position and a second position, and
the exposure opening is open when the synchronizer ring is in the first position and closed when the synchronizer ring is in the second position, and
a braking member to decelerate the shutter mechanism, wherein
the braking member includes a braking ring to decelerate the shutter mechanism by limiting a position of the synchronizer ring,
the braking ring includes a plurality of limiting portions arranged in a circumferential direction of the braking ring and distributed on the braking ring at equal intervals.

18. A shutter, comprising:
a shutter base including an exposure opening;
a shutter mechanism including a blade assembly and a synchronizer ring to drive the blade assembly, wherein
the synchronizer ring is movable between a first position and a second position, and
the exposure opening is open when the synchronizer ring is in the first position and closed when the synchronizer ring is in the second position; and a braking member to decelerate the shutter mechanism, wherein
the braking member includes at least one friction member to decelerate the shutter mechanism by friction, and
the at least one friction members includes a plurality of friction members, and the plural friction members and a plurality of limiting slots are staggered along the circumferential direction of the braking ring.

* * * * *